United States Patent
Wang et al.

(10) Patent No.: US 9,594,159 B2
(45) Date of Patent: Mar. 14, 2017

(54) 2-D OBJECT DETECTION IN RADAR APPLICATIONS

(71) Applicant: Texas Instruments Incorporated, Dallas, TX (US)

(72) Inventors: Dan Wang, Dallas, TX (US); Murtaza Ali, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 478 days.

(21) Appl. No.: 14/277,033

(22) Filed: May 13, 2014

(65) Prior Publication Data
US 2016/0245911 A1     Aug. 25, 2016

Related U.S. Application Data

(63) Continuation of application No. 61/846,517, filed on Jul. 15, 2013.

(51) Int. Cl.
*G01S 13/93*   (2006.01)
*G01S 7/292*   (2006.01)
(Continued)

(52) U.S. Cl.
CPC .............. *G01S 13/72* (2013.01); *G01S 7/292* (2013.01); *G01S 7/2922* (2013.01);
(Continued)

(58) Field of Classification Search
CPC ........ G01S 13/93; G01S 13/931; G01S 7/292; G01S 7/2922; G01S 7/2927; G01S 7/354;
(Continued)

(56) References Cited

U.S. PATENT DOCUMENTS 5,416,488 A * 5/1995 Grover .................. G01S 7/2927
                                                          342/109
5,508,706 A * 4/1996 Tsou .................... B60Q 1/0023
                                                          342/110
(Continued)

OTHER PUBLICATIONS

Li Daojing and Yu Guilong, "2D-OS-CFAR Detector for Cloud Clutter Suppression", 2001 CIE International Conference Radar Proceedings, Oct. 15-18, 2001, Beijing, China, pp. 350-353.*

(Continued)

*Primary Examiner* — Peter Bythrow
(74) *Attorney, Agent, or Firm* — Ronald O. Neerings; Charles A. Brill; Frank D. Cimino (57) ABSTRACT

A set of radar data is organized as a two dimensional (2D) array with multiple lines of data. A 2D cross point analysis is performed on each set of data to detect objects in range of the radar system. A set of candidate objects is identified by performing an initial one dimensional (1D) analysis on a line of data along a first axis of the set if data to determine a candidate location of each candidate object along the first axis; however, the set of candidate objects may include false objects. The set of candidate objects is pruned by performing a cross 1D analysis of the data along a second axis of the set of data at a position corresponding to each candidate location along the first axis to select a set of most likely candidate objects from the set of candidate objects.

20 Claims, 9 Drawing Sheets

(51) Int. Cl.
*G01S 13/72* (2006.01)
*G01S 13/42* (2006.01)
*G01S 7/41* (2006.01)
G01S 13/58 (2006.01)
G01S 7/35 (2006.01)
G01S 13/524 (2006.01)
G01S 13/50 (2006.01)

(52) U.S. Cl.
CPC ............ *G01S 7/2927* (2013.01); *G01S 7/414* (2013.01); *G01S 13/42* (2013.01); *G01S 13/931* (2013.01); *G01S 7/354* (2013.01); *G01S 13/50* (2013.01); *G01S 13/5244* (2013.01); *G01S 13/581* (2013.01); *G01S 2013/9332* (2013.01)

(58) Field of Classification Search
CPC ...... G01S 7/414; G01S 13/50; G01S 13/5244; G01S 13/581
USPC ......................................... 342/70–72, 90, 93
See application file for complete search history.

(56) References Cited

U.S. PATENT DOCUMENTS

| | | | | |
|---|---|---|---|---|
| 5,793,326 A * | 8/1998 | Hofele | ................... | G01S 7/2927 342/159 |
| 6,252,540 B1 * | 6/2001 | Hale | ................... | G01S 7/2921 342/159 |
| 6,380,887 B1 * | 4/2002 | Suen | ................... | G01S 7/4004 342/120 |
| 6,456,231 B1 * | 9/2002 | McEwan | ................... | G01S 7/2927 342/159 |
| 6,822,606 B2 * | 11/2004 | Ponsford | ................... | G01S 3/74 342/159 |
| 7,474,258 B1 * | 1/2009 | Arikan | ................... | G01S 7/292 342/107 |
| 7,548,187 B1 * | 6/2009 | Laste | ................... | G01S 13/5244 342/104 |
| 7,737,881 B2 * | 6/2010 | Stove | ................... | G01S 13/5246 342/159 |
| 9,157,992 B2 * | 10/2015 | Wang | ................... | G01S 13/0218 |
| 9,221,396 B1 * | 12/2015 | Zhu | ................... | G01S 17/023 |
| 9,244,159 B1 * | 1/2016 | Korchev | ................... | G01S 7/414 |
| 2003/0174088 A1 * | 9/2003 | Dizaji | ................... | G01S 7/2927 342/93 |
| 2010/0073218 A1 * | 3/2010 | Stockmann | ......... | G01S 13/5248 342/146 |
| 2010/0289692 A1 * | 11/2010 | Winkler | ................ | G01S 7/4008 342/70 |
| 2013/0169470 A1 * | 7/2013 | Emery | .................. | G01S 7/2927 342/91 |
| 2013/0201054 A1 * | 8/2013 | Wang | .................. | G01S 13/0218 342/93 |
| 2013/0265189 A1 * | 10/2013 | Chang | .................... | G01S 17/87 342/52 |
| 2014/0176361 A1 * | 6/2014 | Dizaji | .................. | G01S 7/2922 342/93 |
| 2015/0378016 A1 * | 12/2015 | Schoor | ................. | G01S 13/345 342/21 |
| 2016/0061946 A1 * | 3/2016 | Wallace | .............. | G01S 13/5242 342/161 |
| 2016/0124075 A1 * | 5/2016 | Vogt | ....................... | G01S 7/023 342/13 |

OTHER PUBLICATIONS

Andrew Robertson et al, "Increasing Automotive Safety Through Embedded Radar Technologies", Freescale, Whitepaper, Jul. 2013, pp. 1-9.
"Automotive Radar, High-resolution 77 GHz radar", Freescale, Fact Sheet, 2011, pp. 1-2.
Hermann Rohling, "Radar CFAR Thresholding in Clutter and Multiple Target Situations", IEEE Transactions on Aerospace and Electronic Systems, vol. AES-19, No. 4, Jul. 1983, pp. 608-621.

* cited by examiner

FIG. 12

2-D OBJECT DETECTION IN RADAR APPLICATIONS

CLAIM OF PRIORITY UNDER 35 U.S.C. 119(e)

The present application claims priority to and incorporates by reference U.S. Provisional Application No. 61/846,517, filed Jul. 15, 2013, entitled "Efficient 2-D Cross Object Detection in Radar Applications."

FIELD OF THE INVENTION

This invention generally relates to object detection using radar, and in particular to automotive radar systems.

BACKGROUND OF THE INVENTION

Radar (RAdio Detection And Ranging) is an object-detection system that uses radio waves to determine the range, altitude, direction, or speed of objects. It can be used to detect various object, such as: aircraft, ships, spacecraft, guided missiles, motor vehicles, weather formations, and terrain.

The simplest function of radar is to tell how far away an object is. To do this, the radar device emits a concentrated radio wave and listens for any echo. If there is an object in the path of the radio wave, it will reflect some of the electromagnetic energy, and the radio wave will bounce back to the radar device. Radio waves move through the air at a constant speed (the speed of light), so the radar device can calculate how far away the object is based on how long it takes the radio signal to return.

Radar can also be used to measure the speed of an object, due to a phenomenon called Doppler shift. Like sound waves, radio waves have a certain frequency, the number of oscillations per unit of time. When the radar system and an object are both standing still relative to each other, the echo will have the same wave frequency as the original signal. But when the object is moving relative to the radar system, each part of the radio signal is reflected at a different point in space, which changes the wave pattern. When the object is moving away from the radar system, the second segment of the signal has to travel a greater distance to reach the car than the first segment of the signal. This has the effect of "stretching out" the wave, or lowering its frequency. If the object is moving toward the radar system, the second segment of the wave travels a shorter distance than the first segment before being reflected. As a result, the peaks and valleys of the wave get squeezed together and the frequency increases. The radar system can determine the relative speed of the object based on the Doppler frequency changes.

Clutter refers to radio frequency (RF) echoes returned from targets which are uninteresting to the radar application. Such targets include natural objects such as ground, pavement, puddles, precipitation (such as rain, snow, or hail), blowing sand or dust, atmospheric turbulence, other atmospheric effects, etc., for example.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

High resolution 77 GHz automotive radar systems have been developed to improve driving comfort and safety. The radar sensor can measure the range, velocity and angular position of surrounding objects and this information may be used to instruct a central controller to react appropriately in various driving scenarios. In order to obtain the object information, a signal received from the radar system front end is usually processed via a flow of signal processing steps. As will be described in more detail below, signal processing of the radar signal may be performed by forming a two dimensional (2D) array of data that has a range axis and a speed axis. A set of candidate objects may be identified based on either range or speed by performing an initial one dimensional (1D) analysis of the data along a first one of the two axes to determine a candidate location of each candidate object along the first axis. Unfortunately, the set of candidate objects may typically include false objects. The set of candidate objects may then be pruned by performing a cross 1D analysis of the data along the second one of the two axes at each candidate location along the first axis to select a set of most likely candidate locations from the set of candidate locations.

Typically, it is difficult to detect the boundary of large objects at close range. A second initial 1D analysis may be performed in a neighborhood of each candidate location in which a detection threshold value is reduced by a fixed amount below the signal strength at each candidate location in order to select additional candidate locations that may be related to a large object.

Figure 1:
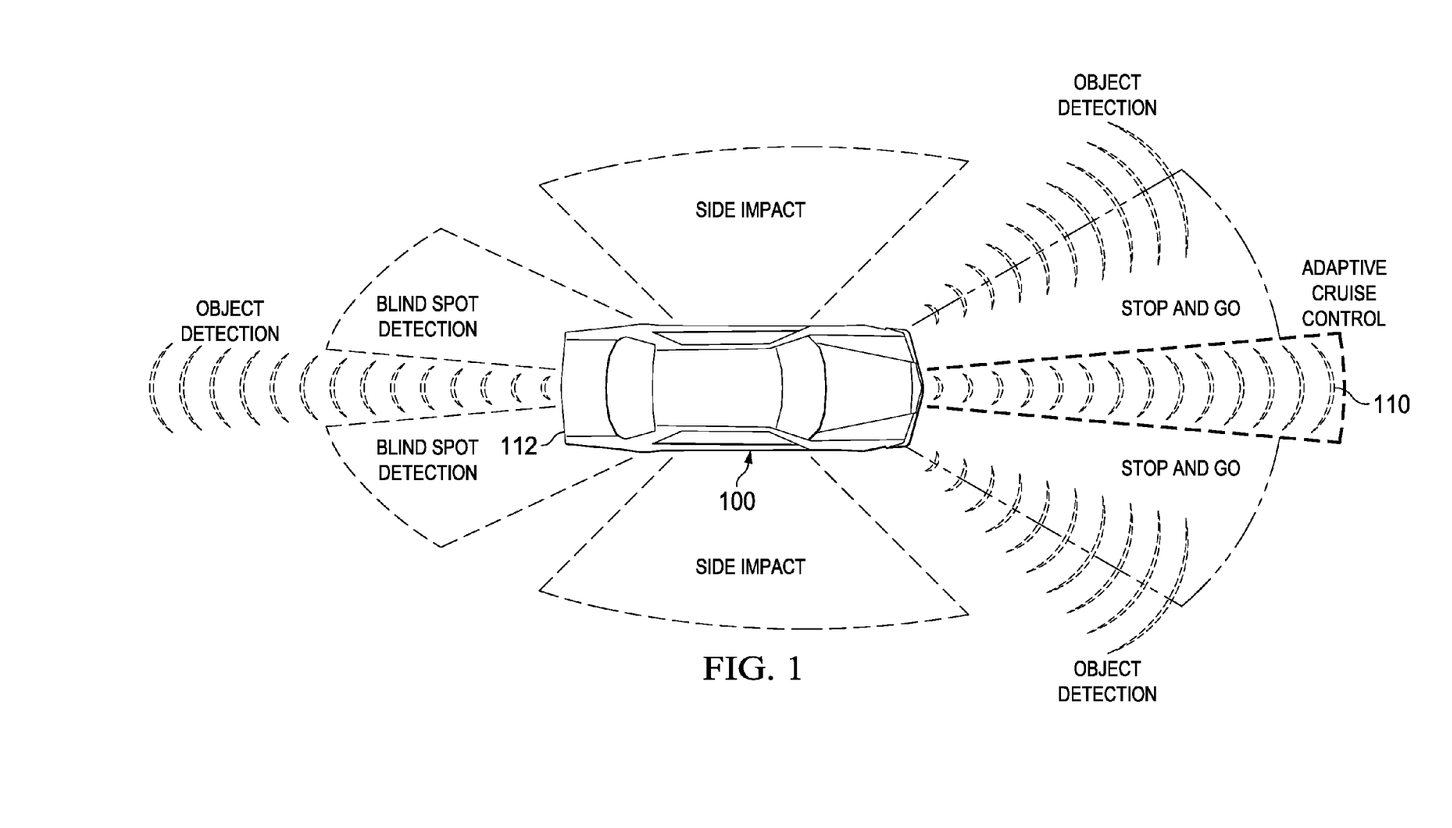
FIG. 1 is an illustration of an automobile that is equipped with multiple radar systems for object detection.

FIG. 1 is an illustration of an automobile 100 that is equipped with multiple radar systems 110, 112 for object detection. Some vehicles may have a single radar system 110 that may be used for tasks such as adaptive cruise control, object warning, automatic braking, etc., for example. Some vehicles may have several radar systems, such as one in front 110 and one in back 112, for example. Some vehicles may have several systems in front, several systems in back, and systems on the left and right side. For example, a vehicle may have three systems in front in which one faces straight ahead and the other two are angled to the left and right, three in back in which one faces straight back and two are angled to the left and right, and one on the left side and one on the right side.

Figure 2:
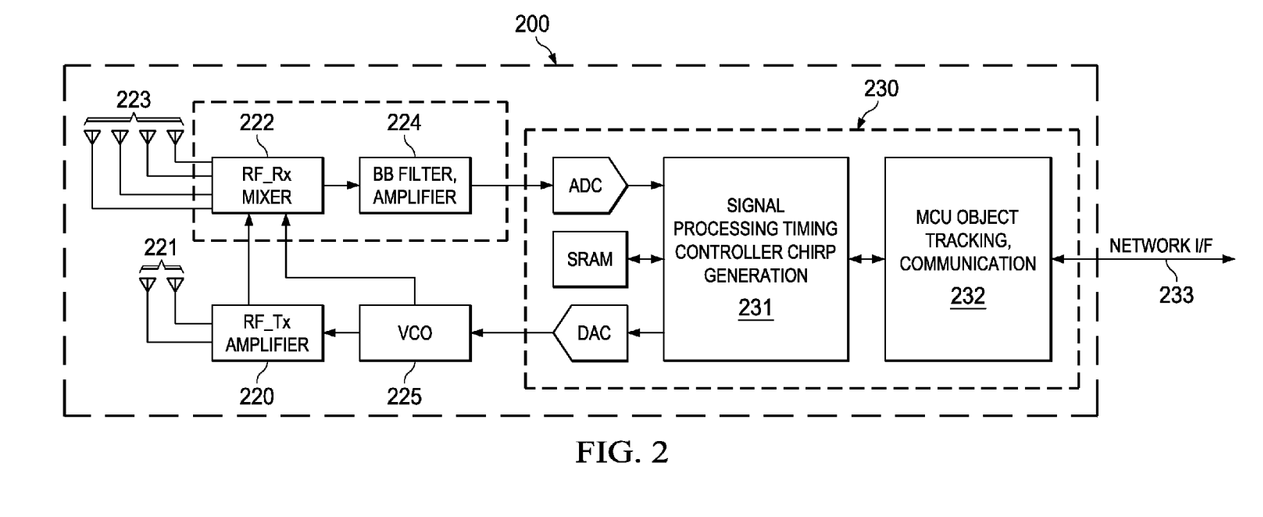
FIG. 2 is a block diagram of an example radar system.

FIG. 2 is a block diagram of an example radar system 200 that may be used in a vehicle, such as automobile 100 of FIG. 1. As discussed above, there may be one, two, or more, such as eight or more, copies of radar system 200 deployed in a vehicle. In this embodiment, radar system 200 includes a transmitter 220 that drives an array 221 of two antennas. A receiver 222 receives signals from an array 223 of four antennas. A baseband module 224 amplifies and filters the received signals that are reflected from objects in the path of the transmitted radio signals, as is well known. In this embodiment, transmitter 220 operates in the 77 gHz region and produces a frequency modulated continuous wave (FMCW) signal. The continuous wave signal is frequency modulated to from a series of chirps, as is well known, by using a voltage controller oscillator (VCO) 225. In this embodiment, the transmit antenna array 221 and receive antenna array 223 are stationary, relative to the vehicle. In other embodiments, the antenna arrays may be configured to transmit and receive across a range of area, such as by mechanical movement, or implementation of a phased array, for example.

Frequency modulated continuous wave radar (FMCW), also referred to as continuous-wave frequency-modulated (CWFM) radar, is a short-range measuring radar set capable of determining distance. This increases reliability by providing distance measurement along with speed measurement, which is essential when there is more than one source of reflection arriving at the radar antenna. This type of radar system is well known and is often used as a "radar altimeter" to measure the exact height during the landing procedure of aircraft, for example. It is also used in many other applications such as early-warning radar in defense systems for missile detection, wave radar for use on off-shore platform, and proximity sensors for vehicles, for example. Doppler shift is not always required for detection when FM is used.

In a FMCW system, the transmitted signal of a known stable frequency continuous wave varies up and down in frequency over a fixed period of time by a modulating signal. Frequency difference between the receive signal and the transmit signal increases with delay and is therefore proportional to distance. This smears out, or blurs, the Doppler signal. Echoes from a target are then mixed with the transmitted signal to produce a beat signal which will give the distance of the target after demodulation.

A variety of modulations are possible in which the transmitter frequency can slew up and down, such as: a sine wave, (such as an air raid siren); a saw tooth wave (such as the chirp from a bird); a triangle wave (such as police siren in the United States); or a square wave (such as a police siren in the United Kingdom), for example.

An advantage of CW radar is that energy is not pulsed so a CW radar system is simpler to manufacture and operate. They have no minimum or maximum range, although the broadcast power level imposes a practical limit on range. Continuous-wave radar maximizes total power on a target because the transmitter is broadcasting continuously.

During normal operation, linear frequency chirps are transmitted and reflected signals are received. The receivers in combination with the transmitter are arranged as a homodyne system so that the received signals are down-converted directly into the baseband in mixer section 222 using a copy of the transmitted signal from VCO 225. The baseband signals are then filtered and amplified by filters and variable gain amplifiers 224. After converting the baseband signals into the digital domain, Fast Fourier Transforms (FFT) and tracking algorithms may be applied in order to detect objects in terms of distance, velocity, and angular position.

Processing system 230 includes a signal processing portion 231 that receives a stream of data from receiver antenna array 223 via a analog to digital converter (ADC) and perform chirp generation and control of the transmitter via a digital to analog converter (DAC). A varying voltage tuning control signal from the DAC is used to control VCO 225. A static random access memory (SRAM) may be used to store instructions and data received from antenna array 223. Processing system 230 also includes a microprocessor control unit (MCU) 232 that may perform signal processing for object detection and tracking, and communicate with other systems in the vehicle via a network interface 233. Network 233 may be an internet or other known or later developed wired or wireless communication mechanism that is appropriate for use within a vehicle, for example. A process for object detection by MCU 232 will be described in more detail below.

Figure 3:
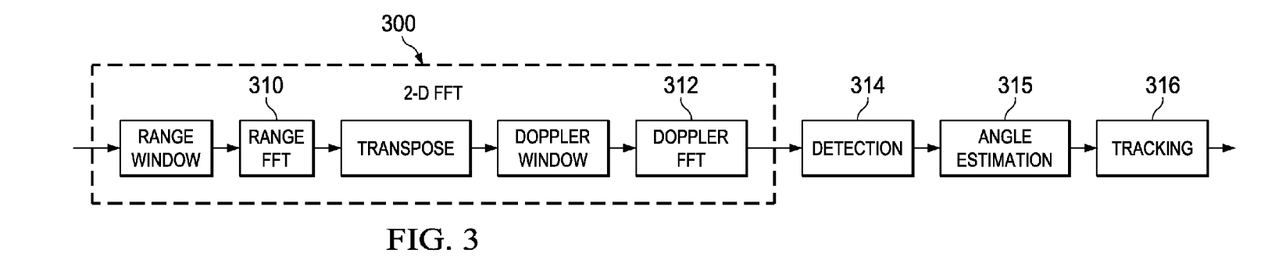
FIG. 3 illustrates a process flow for object detection and tracking in a radar system.

FIG. 3 illustrates a process flow 300 for object detection and tracking in a radar system, such as radar system 200, by using two FFTs (fast Fourier Transforms). A range FFT 310 and a Doppler FFT 312 transfer the beat signal received from the base-band filter and amplifier 224 into the frequency domain. The general operation of FFT processing of radar data is well known and need not be described in further detail herein. The locations of the amplitude peaks in the range-velocity plane may then be detected 314 to estimate the range and velocity information of the targets, as will be described in more detail below. The angle of arrival of each detected target may also be estimated 315 for object localization and map creation. Tracking 316 is required to efficiently update the information of moving targets.

Figure 4:
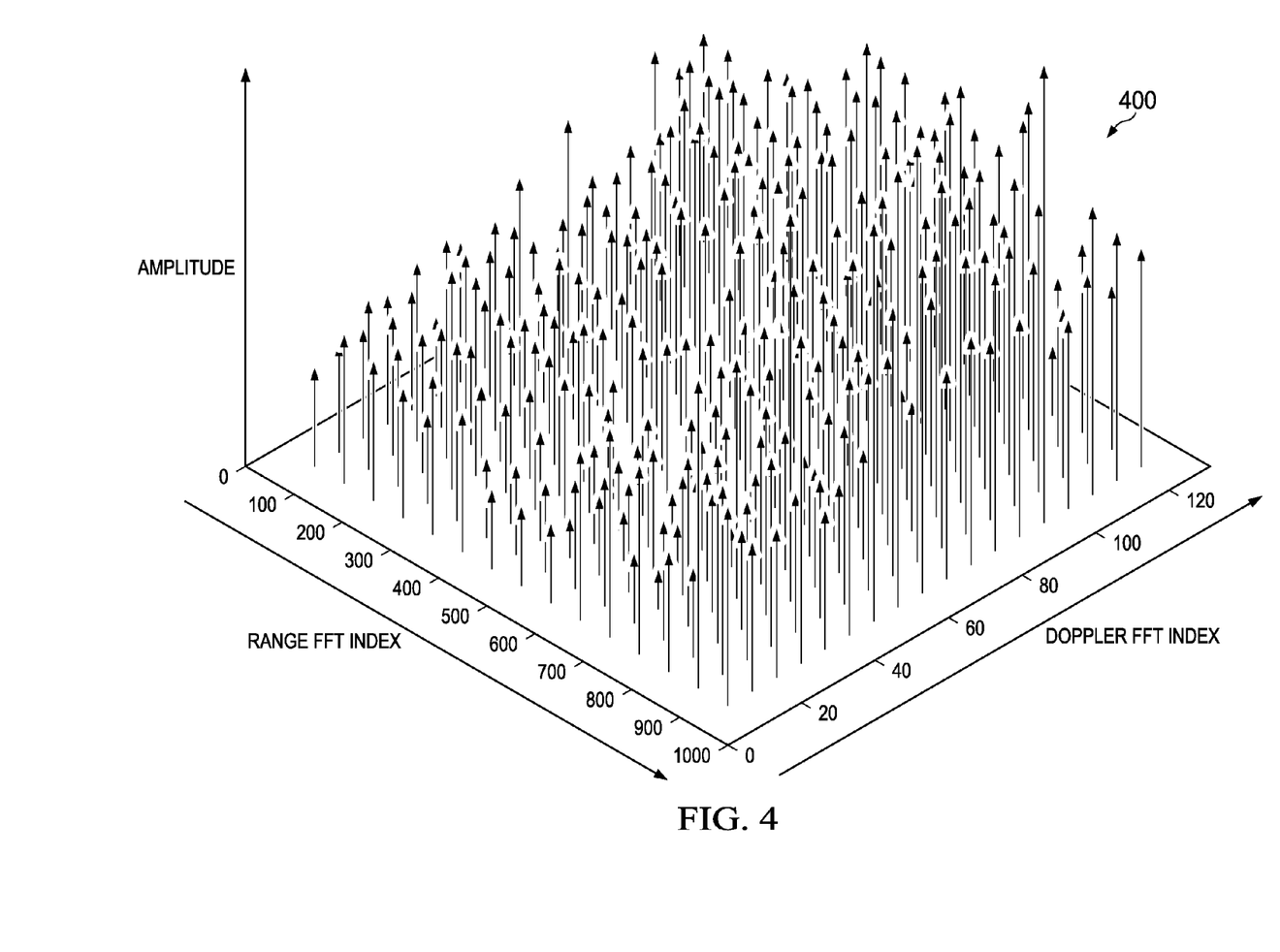
FIG. 4 is an example plot of a frame of processed radar data organized in a matrix with a range and a doppler axis.

FIG. 4 is an example plot of a frame of processed radar data 400 organized in a matrix with a range axis and a Doppler axis. In this embodiment, the transmitter continuously transmits the frequency modulated continuous wave signal, but processing system 230 divides the received data into frames of data. In this embodiment, a new frame is formed every 40 ms. Each frame of data represents about 5 ms worth of received reflection signals. The modulation may be programmed to vary the chirp rate during the 5 ms period. In this embodiment, the chirp rate can be selected from a range of approximately 32 to 256 chirps per 5 ms. During the remaining 35 ms of each frame period, the receiver is put in a low power mode and no receiver signal is produced.

As mentioned above, each radar system 200 has an array 223 of four receive antenna. For object detection, the signals from all four antennas are added non-coherently to produce a signal summation from all four antennas. For angular estimation, the time of arrival of signals at each antenna is used to determine the angular position of detected objects.

Figure 5:
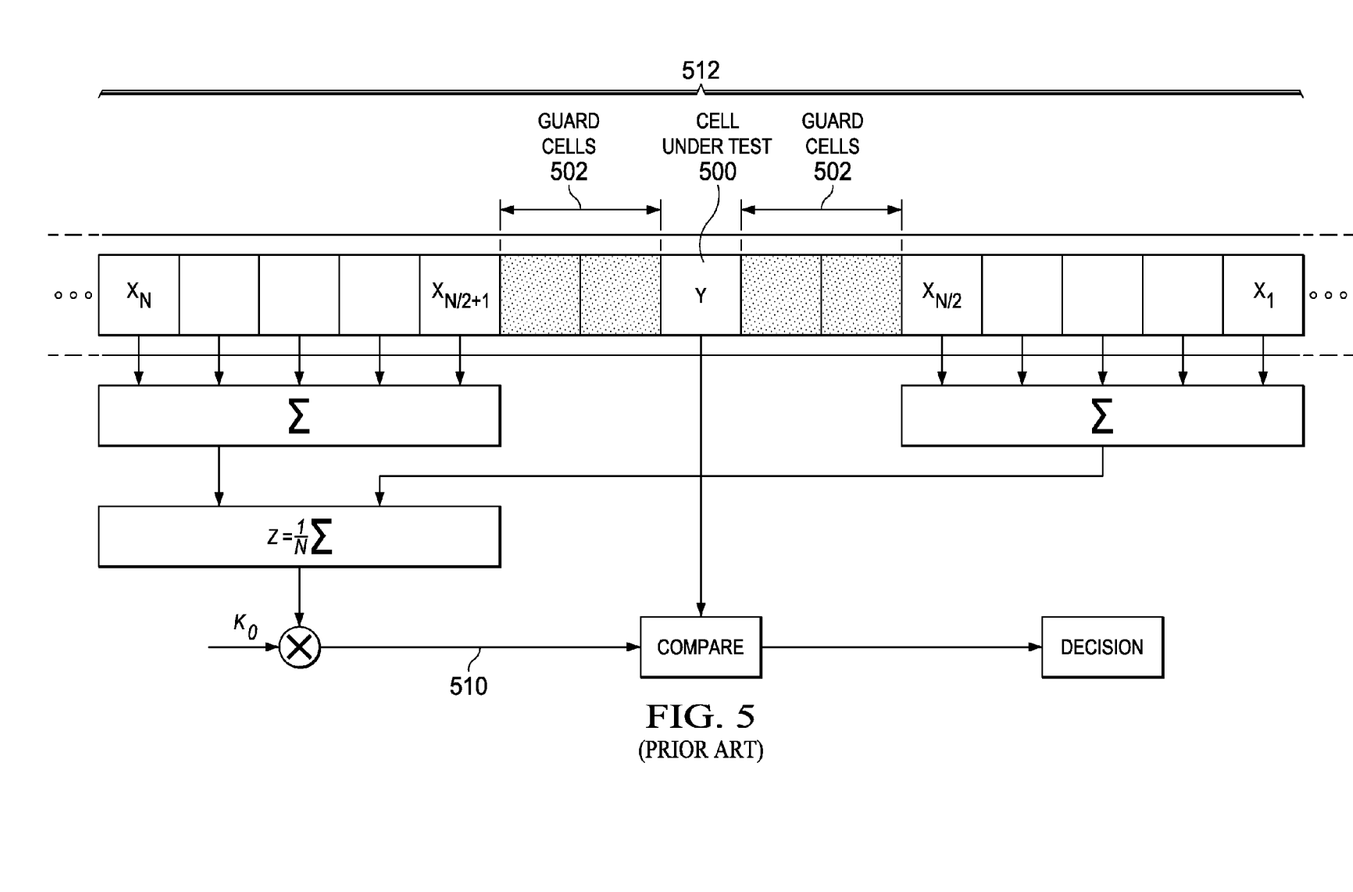
FIG. 5 illustrates a prior art one dimensional detection scheme.
Figure 6:
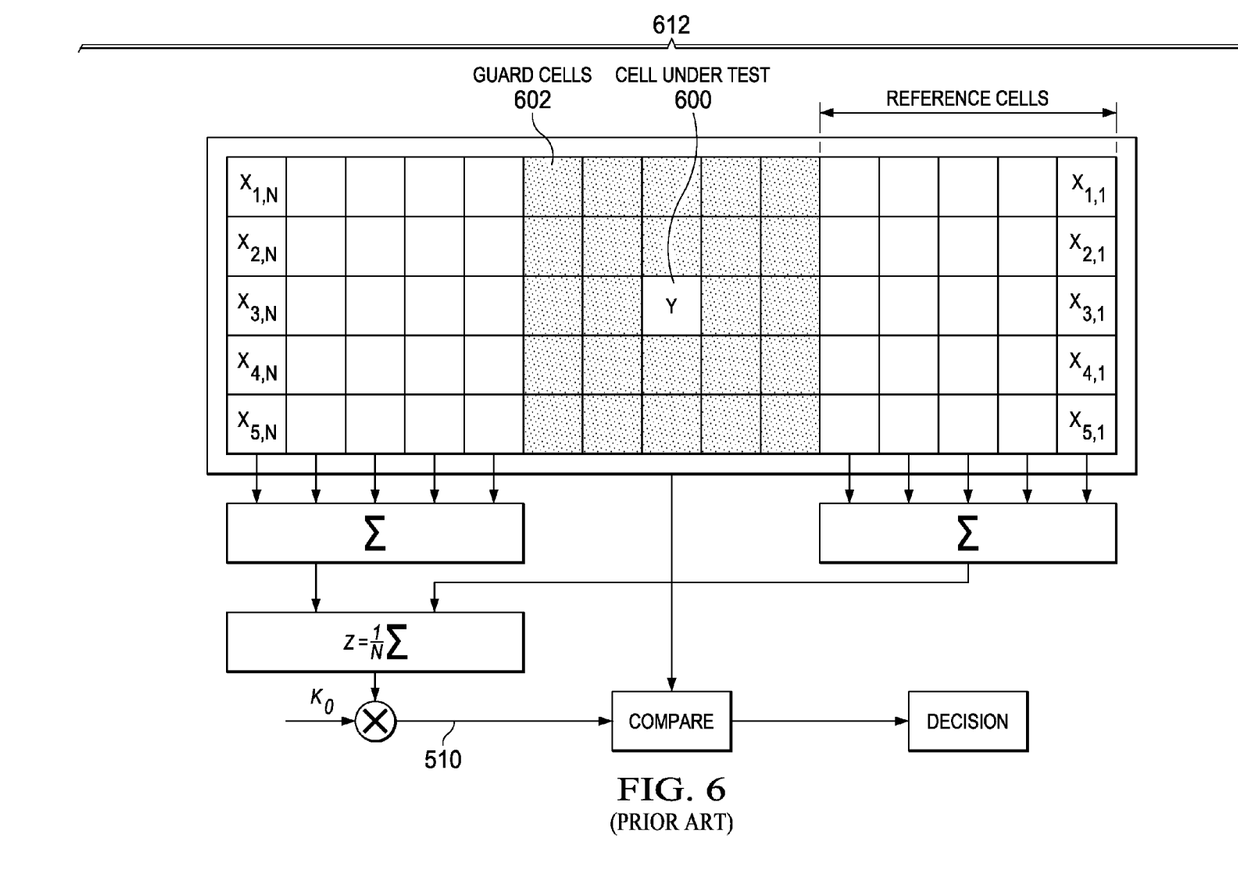
FIG. 6 illustrates a prior art two dimensional detection scheme.

As can be seen in FIG. 4, the presence of objects within the clutter presents a significant signal processing challenge. The performance of the radar system highly depends on the detection method. The detection algorithm should feature low false alarm rate, high detection rate, and low computational cost. The challenges for detection include interference of the clutter and energy leakage from the main signal lobe to side lobes. A well known detection method performs line-by-line one dimensional detection either along the range direction or along the velocity direction, as illustrated in FIG. 5. A reference window is used to estimate the noise variance to determine the threshold for detection. A second known detection method relies on a two-dimensional reference window, as illustrated in FIG. 6. The one dimensional method is simple to implement, but it leads to high false alarm rate due to clutter effect from the ground and energy leakage from the main lobe to the side lobes. On the other hand, the traditional 2-D detection method requires maintaining a 2-D reference window to alleviate the energy leakage issue. However, it requires heavy memory access into the buffer memory that is holding the frame of processed antenna data and high computational cost. Further, based on simulation tests, this traditional 2-D detection method also has high false alarm rate at the presence of clutter.

FIG. 5 illustrates a prior art one dimensional detection scheme. This scheme is described in detail in "Radar CFAR Thresholding in Clutter and Multiple Target Situations", Rohling, H., AEG-Telefunken, Aerospace and Electronic Systems, IEEE Transactions on, Vol. AES-19(4), pp. 608-621, 1983 and is incorporated by reference herein. A brief description is included herein.

The task of primary radars used in vehicle, air, or vessel traffic control is to detect all objects within the area of observation and to estimate their positional coordinates. Generally speaking, target detection would be an easy task if the echoing objects were located in front of an otherwise clear or empty background. In such a case the echo signal can simply be compared with a fixed threshold, and targets are detected whenever the signal exceeds this threshold.

In real world radar applications, however, the target practically always appears before a background filled (mostly in a complicated manner) with point, area, or extended clutter. Frequently the location of this background clutter is additionally subject to variations in time and position.

Radar detection procedures involve the comparison of the received signal amplitude to a threshold. Usually the background reflectors, undesired as they are from the standpoint of detection and tracking, are denoted by the term "clutter," and in the design of the signal processing circuits the assumption may be made that this clutter is uniformly distributed over the entire environment. However, in order to obtain a constant false-alarm rate (CFAR), an adaptive threshold must be applied reflecting the local clutter situation. The cell averaging approach, for example, is an adaptive procedure.

Referring still to FIG. 5, an adaptive signal processing technique operates with a variable detection threshold 510 that may be determined in accordance to the local clutter situation. In order to obtain the needed local clutter information, a certain environment defined by a window 512 around the radar test cell 500 may be analyzed. Guard cells 502 may be exempt from the window for calculation of the adaptive threshold 510.

Various types of cell average may be implemented, such as: cell averaging CFAR (CA CFAR), cell averaging CFAR with greatest of (GO) selection (CAGO CFAR), an ordered statistic CFAR (OS CFAR), for example. The first two processing methods can be described in terms of a split neighborhood 512. From each of the two neighborhood areas the arithmetic mean of the amplitude contained therein is obtained. The two clutter power estimators may then be combined into one single value either by further averaging or by maximum selection, for example. The main difference between CA CFAR and CAGO CFAR is that the former is implicitly based on the assumption of a clutter situation uniform in the entire neighborhood area whereas the latter makes allowance for clutter edges occurring within the reference area.

OS CFAR is performed by rank ordering the values encountered in the neighborhood area according to their magnitude and by selecting a certain predefined value from the ordered sequence. This can be the median, the minimum, the maximum, or any other value, for example.

FIG. 6 illustrates a prior art two dimensional detection scheme. This scheme is described in detail in "2D-OS-CFAR detector for cloud clutter suppression", Li Daojing, Yu Guilong, 2001 CIE International Conference on Radar, pp 350-353, 2001 and is incorporated by reference herein. Similar to the 1D scheme of FIG. 5, in this scheme an adaptive signal processing technique operates with a variable detection threshold 510 that may be determined in accordance to the local clutter situation. As mentioned above, in order to obtain the needed local clutter information, a certain environment defined by a two dimensional neighborhood window 612 around the radar test cell 600 may be analyzed. A two dimensional array of guard cells 602 may be exempt from the window for calculation of the adaptive threshold 510. However, in this scheme, the memory that is storing the set of FFT indexes from the radar data must be accessed in a much more complicated manner in order to access the two dimensional neighborhood 612.

To solve the limitations of the traditional methods described above, an improved 2D cross object detection method that may significantly reduce the false alarm rate during detection with efficient memory access and low computational cost will now be described. This method first performs detection in the range direction, similar to the traditional one dimensional method illustrated in FIG. 5. A second step then detects along the velocity/Doppler direction only at each range index where objects are detected in the first step. Finally, the indexes at the cross points in both directions are declared as the detected objects.

Figure 7:
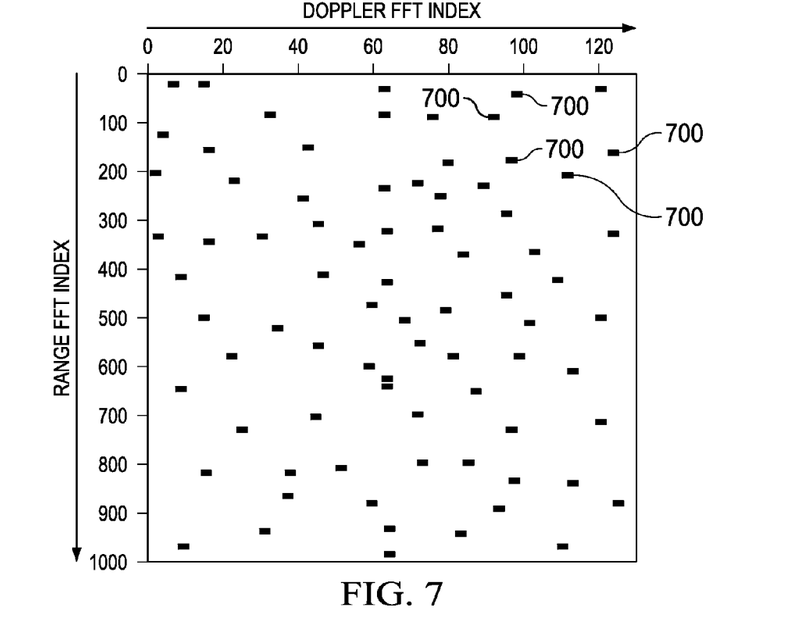
FIG. 7 illustrates an example result after performing a one dimensional analysis to identify a set of candidate objects.

FIG. 7 illustrates an example result after performing a one dimensional analysis to identify a set of candidate object. All of the illustrated points, such as indicated at 700, represent a set of candidate objects that was detected using the simple 1D analysis along a range line of a frame of processed antenna data, such as illustrated in FIG. 4. For example, if the frame data illustrated in FIG. 4 is organized as a 256×256 array of data, then 256 repetitions of the 1D analysis may be required to detect all of the candidate object locations illustrated in FIG. 7 by processing each row of data with the simple 1D analysis along each range line of data.

Figure 8:
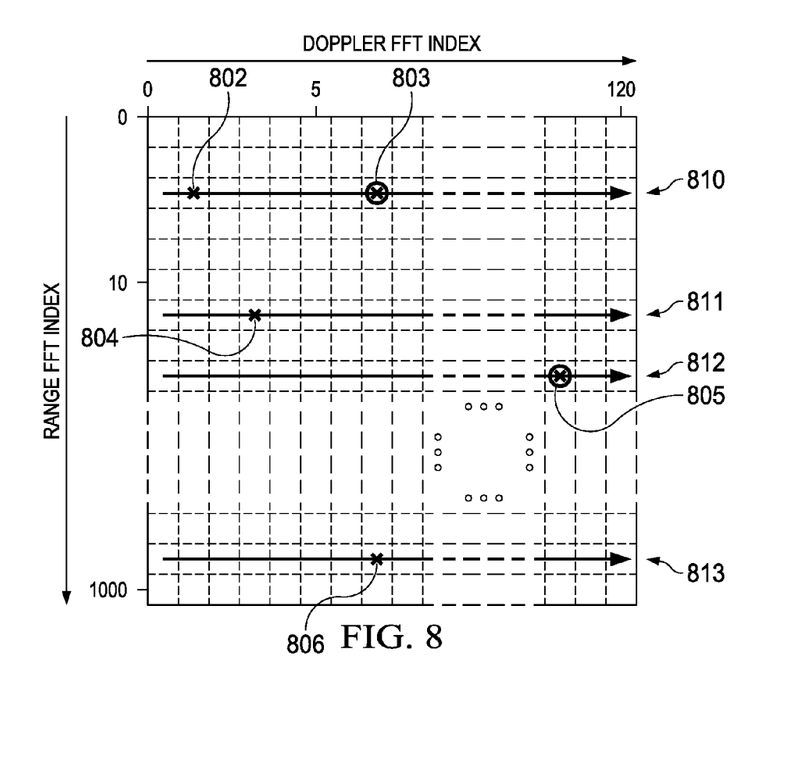
FIG. 8 illustrates pruning of the set of candidates by performing a cross one-dimensional analysis at each candidate location.

FIG. 8 illustrates pruning of the set of candidate objects by performing a cross one-dimensional analysis at each candidate location. For clarity, FIG. 8 is enlarged and only shows a small portion of the data illustrated in FIG. 7. As described above, a set of candidate objects is identified by performing an initial one dimensional analysis along a first axis of the set if data to determine a candidate location of each candidate object along the first axis. In this example, each column of the array represents one line of range FFT index data and the 1D analysis is performed on each column of the array. The set of candidate objects may include false objects, as discussed above. In this example, the set of candidate objects includes 802-806.

The set of candidate objects 802-806 is then pruned by performing a cross 1D analysis of the data along a second axis of the set of data at a position corresponding to each candidate location along the first axis to select a set of most likely candidate objects from the set of candidate objects. In this example, the cross 1D analysis is only performed at positions 810-813 along the range axis that correspond to the locations of candidate objects 802-806. In this example, candidate objects 802, 804 and 806 are pruned and objects 803 and 805 are selected as the set of most likely candidate locations as a result of the cross 1D analysis.

In this example, the array of frame data is 256×256. The initial 1D analysis is performed 256 times to identify the complete set of candidate objects. The pruning analysis is performed only at the identified candidate locations, which is much fewer than 256. Thus, the total computation task is simplified as compared to the window approach of FIG. 6 because only a simple 1D analysis similar to FIG. 5 is used for both the initial analysis along the range axis and the pruning analysis along the Doppler axis. A significantly lower amount of memory access is required since the memory access in both steps only involves a one dimensional window as compared to the two dimensional window approach of FIG. 6. Simulations have indicated that the false alarm rate for the cross object detection scheme of FIGS. 7 and 8 is lower than that for the 2D window scheme of FIG. 6.

Figure 9:
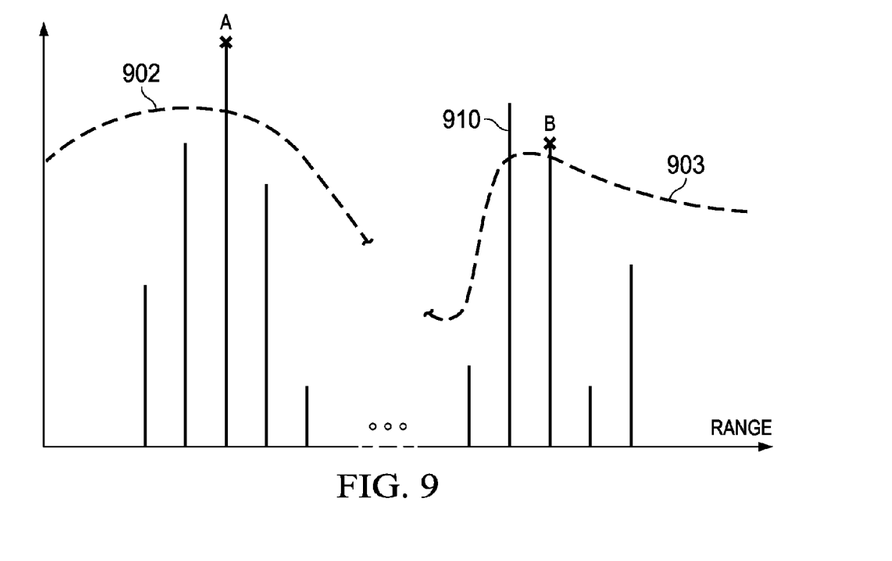
FIG. 9 illustrates an example object detection result.

FIG. 9 illustrates an example object detection result of one line of an initial 1D analysis along the range axis. In this example, two candidate objects A and B were identified based on the amplitude of the FFT index being above the adaptive threshold value, which is indicated at 902, 903. Note in this example that the data point at index position 910 was not selected even though it exceed the adaptive threshold value 903. This is because in this example of a 1D detection analysis, consideration may be given to the profile of the guard cells 502 adjacent each cell under test 500, referring back to FIG. 5.

However, it has now been determined that detection of boundaries of large objects at close range is challenging. This is because at close range a large object may cause the range data to smear across more than one location index. This is important for short range applications, such as parking assistance in ADAS (advanced driving assistance system). The CFAR algorithm is able to find the signal peak but fails to detect the spread range profile for large object. To overcome this issue, a second step may perform a nearby search in the neighborhood of each initial object candidate using a reduced threshold.

Figure 10:
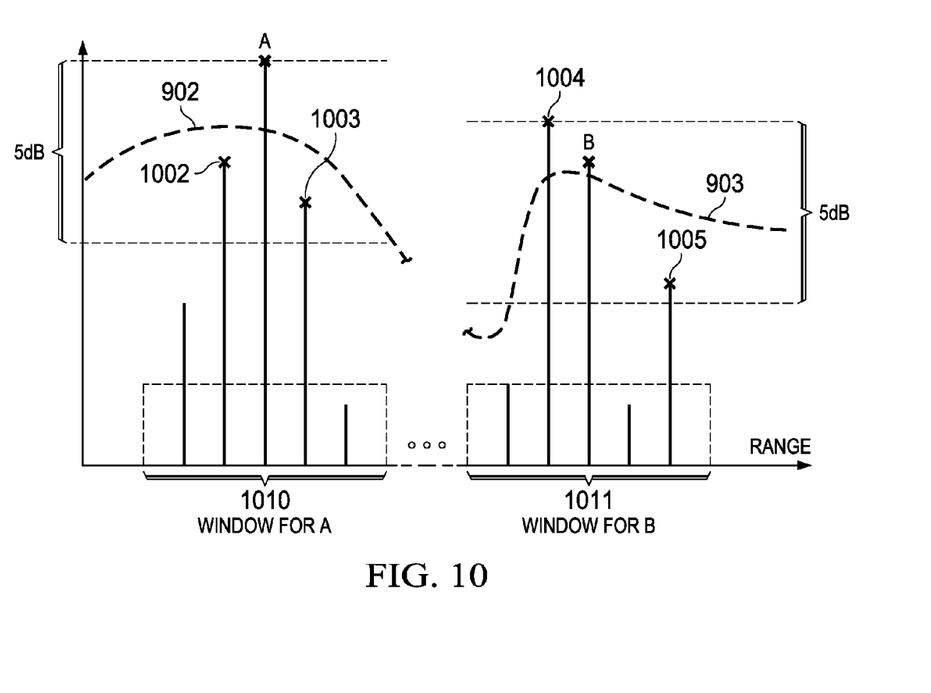
FIG. 10 illustrates neighborhood reduction of detection thresholds to identify large objects.

FIG. 10 illustrates neighborhood reduction of detection thresholds to identify large objects. Point A and point B are detected from the initial 1D detection analysis along the range axis. However, close by range bins, such as 1002, 1003 around object A and 1004, 1005 near object B failed to pass the detection. In this example, a second search step further detects the spread range bins using a threshold set at 5 dB below the amplitude of each first detected point. In this example, a neighborhood window 1010 for cell position A extends two cell positions on each side of cell A. Similarly, neighborhood window 1011 for cell position B extends two cell positions on each side of cell B.

While a 5 dB threshold adjustment is used in this example, other embodiments may use larger or smaller adjustment values. While a window size of five is illustrated here, other window sizes may be used.

The adjustment may also be applied in a selective manner. For example, for short range index positions, a larger adjustment value may be used, and for further away range index positions, the adjustment value may be reduced. At a certain range index position that represents a location that is far enough away from the radar system so that large object detection is not critical, the adjustment step may be concluded and not performed for further away range positions, for example. Similarly, in some embodiments the window size may adaptive based on range, for example.

For example, for a radar system that is used for parking assistance, edge detection of large objects that are farther away than about twenty feet from the radar system may not need to be done. Therefore, in such an example, the threshold adjustment process on each line of data may only need to be done for the range index cells that represent an object that is closer than 20 feet, for example.

Figure 11:
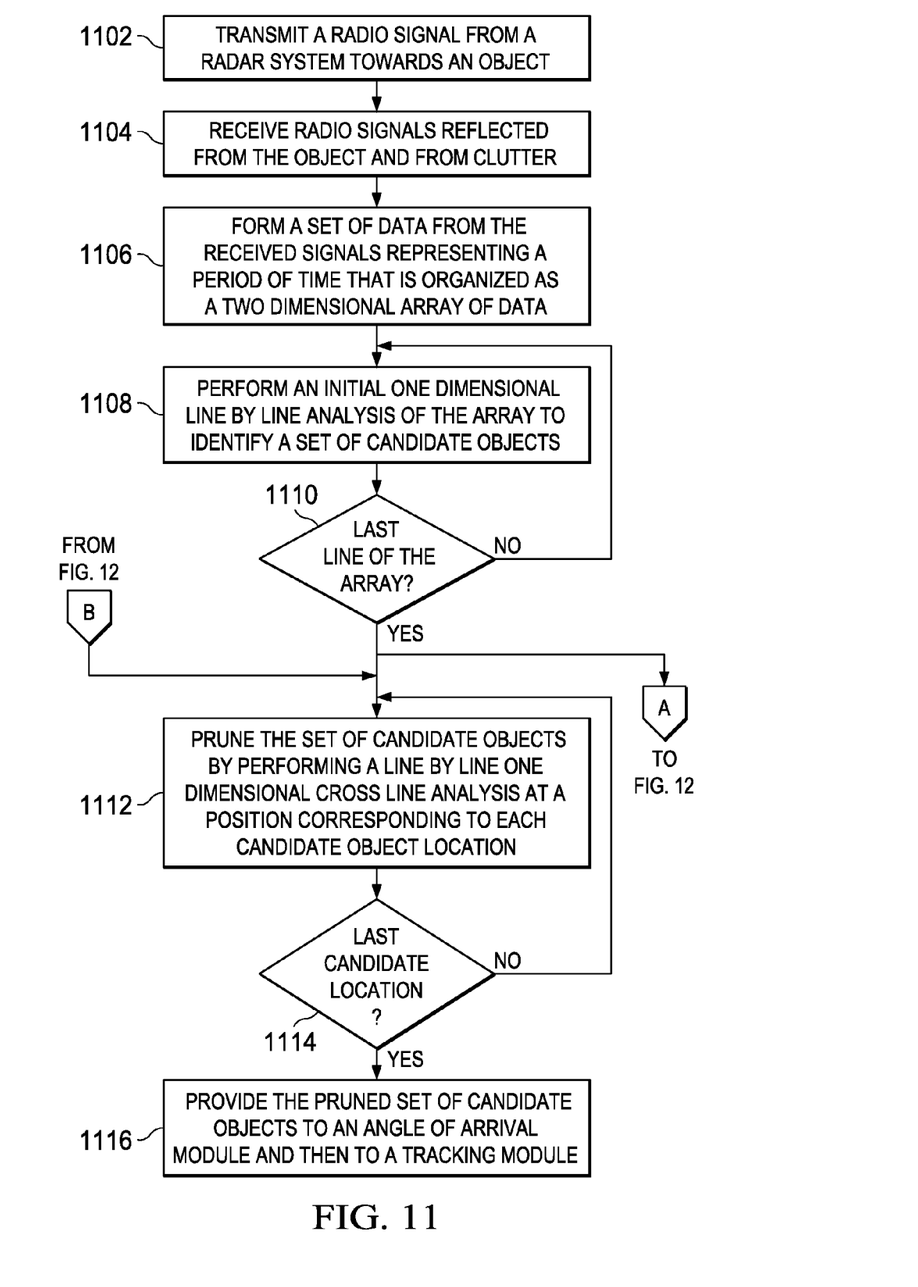
FIG. 11 is a flow chart illustrating detection of objects using two dimensional cross point analysis.

FIG. 11 is a flow chart illustrating detection of objects using a two dimensional cross point analysis process. As discussed above, a radar system such as radar system 200 transmits 1102 a radio signal from the radar system towards one or more objects. As discussed above, various embodiments may use various radar techniques, such as: a FMCW signal, a pulsed signal, stationary or movable antenna, single or phased array antennas, etc., for example.

The radar system then receives 1104 radio signals reflected from the one or more objects. As discussed above in more detail, the received radio signals may include valid object reflections and reflections from clutter.

A set of data is periodically formed 1106 from the received signals. Each set of data is organized as a two dimensional array that has multiple lines of data, such as illustrated in FIG. 4. In this embodiment, the array of data has a range axis and a Doppler axis. As discussed above, in this embodiment a set of data is formed every 40 ms based on data received from a 5 ms frame of received reflection data.

A 2D cross point analysis is performed on each set of data to detect the one or more objects. The cross point analysis includes an initial 1D analysis 1108 along every line 1110 of data in one axis of the array to identify a set of candidate objects. However, as discussed above, the set of candidate objects may include a large number of clutter objects that are not of interest. The 2D cross point analysis then continues by pruning the set of candidate objects. The set of candidate objects is pruned 1112 by performing a cross 1D analysis of the data along a second axis of the set of data at a position corresponding to each candidate location along the first axis to select a set of most likely candidate objects from the set of candidate objects.

After the last candidate location of the set of candidate objects is pruned 1114, the set of most likely candidate objects may then be presented 1116 to an angle of arrival module such as 315, referring to FIG. 3, followed by a tracking module such as 316. Angle of arrival determination and object tracking may be performed by processing the pruned set of candidate objects using now known or later developed signal process techniques.

The process of object detection, angle of arrival and object tracking may be performed by a signal processor 231 and/or microprocessor 232, referring again to FIG. 2. The results may then be shared with other control unit(s) in a vehicle, for example, that is coupled to the radar system by a communication network, such as network 233.

Figure 12:
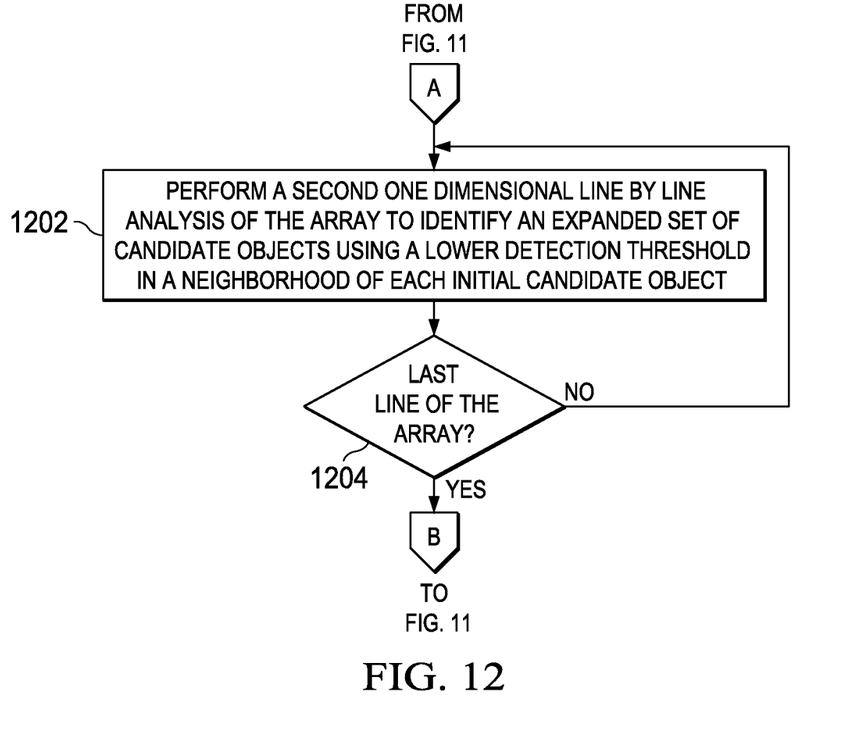
FIG. 12 is a flow chart illustrating detection of large nearby objects.

FIG. 12 is a flow chart illustrating an option to improve detection of large nearby objects. As discussed above, detection of boundaries of large objects at close range is challenging. This is because at close range a large object may cause the range data to smear across more than one location index. As illustrated in FIGS. 11 and 12, after the initial 1D analysis 1108, 1110 a second initial 1D analysis may be performed around the neighborhood of each candidate object location.

As discussed above, a candidate location is selected in the initial 1D analysis 1108 for each location along the first axis at which the signal strength at that index position exceeds a detection threshold value, as illustrated in FIG. 9.

For close range object edge detection, a second one dimensional line by line analysis of the array may be performed 1202 to identify an expanded set of candidate objects using a lower detection threshold in a neighborhood of each initial candidate object. As discussed above, in one example, the detection threshold may be reduced by 5 dB below the amplitude of each candidate object selected in the initial analysis 1108. As discussed above, the threshold adjustment value may be reduced as the range increases. Once a selected range is reached, the second adjustment may be discontinued on each line, for example.

In this example, the close range object edge detection process 1202, 1204 is performed after all of the initial 1D analyses have been performed 1110. Alternatively, the close range object detection may be performed on each line immediately after the initial 1D analysis 1108 of the line is performed, for example. In another embodiment, a close range object detection step may be performed as each candidate object is indentified in the initial 1D analysis step 1108, for example.

Other Embodiments

While the invention has been described with reference to illustrative embodiments, this description is not intended to be construed in a limiting sense. Various other embodiments of the invention will be apparent to persons skilled in the art upon reference to this description. For example, range and Doppler are the two dimensions mentioned in this description. The methods described herein may be used for other two dimensional signal combinations, such as range and angle 2D detection, for example. While an automotive application was described herein, other embodiments may be used for other types of land based vehicles, such as trucks, for example. Other embodiments may include airborne or water borne vehicles, such as boats, ships, planes, missiles, drones, etc., for example.

Other embodiments may be used for personal navigation, such as for a sight impaired person. The radar systems may be mounted on a vehicle, such as: clothing, a back or front pack, a helmet, on a wheel chair, scooter, or other mobility device, for example. Feedback to the user may be provided by sound or touch, for example.

Embodiments of the systems and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM (ferroelectric RAM) may be used to implement aspects of the signal processing. Analog-to-digital converters and digital-to-analog converters provide coupling to the real world, modulators and demodulators (plus antennas for air interfaces) may provide coupling for waveform reception of data being broadcast over the air by satellite, TV stations, cellular networks, etc or via wired networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP), for example. The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for detecting an object in a radar system, the method comprising:
   transmitting a radio signal from the radar system towards one or more objects;
   receiving radio signals reflected from the one or more objects by the radar system, wherein the received radio signals include clutter signals;
   forming a set of data periodically from the received signals, wherein the set of data is organized as a two dimensional (2D) array having a plurality of lines of data; and
   performing a 2D cross point analysis of each set of data to detect the one or more objects, wherein the 2D cross point analysis comprises:

identifying a set of candidate objects by performing an initial one dimensional (1D) analysis on a line of data along a first axis of the set if data to determine a candidate location of each candidate object along the first axis, wherein the set of candidate objects includes false objects; and pruning the set of candidate objects by performing a cross 1D analysis of the data along a second axis of the set of data at a position corresponding to each candidate location along the first axis to select a set of most likely candidate objects from the set of candidate objects.

2. The method of claim 1, wherein a candidate location is selected in the initial 1D analysis for each location along the first axis at which signal strength exceeds a detection threshold value; and further comprising performing a second initial 1D analysis in a neighborhood of each candidate location in which the detection threshold value is reduced by a fixed amount below the signal strength at each candidate location to select additional candidate locations along the first axis.

3. The method of claim 1, wherein receiving the radio signals comprises mixing the received radio signals with a copy of the transmitted signal to form beat signals; and wherein forming each set of data comprises processing the beat signals using Fast Fourier Transforms (FFT) to form a set of FFT index values.

4. The method of claim 1, wherein each set of data corresponds to a frame period that includes multiple chirps of a frequency modulated continuous wave transmitted signal.

5. The method of claim 1, wherein each set of data corresponds to a pulse period of a pulsed transmitted signal.

6. The method of claim 1, wherein the first axis represents range data and the second axis represents doppler data.

7. The method of claim 1, wherein the first axis represents Doppler data and the second axis represents range data.

8. The method of claim 2, wherein the second initial 1D analysis for a candidate location in a line of data is performed before performing a first initial 1D analysis on a next line of data.

9. The method of claim 2, wherein the detection threshold for the second initial 1D analysis is reduced by an amount that varies along the first axis.

10. The method of claim 2, wherein a size of the neighborhood for the second initial 1D analysis of each candidate object is selected based on a location of each candidate object along the first axis.

11. A non-transitory computer-readable medium storing software instructions that, when executed by a processor, cause a method for detecting an object in a radar system to be performed, the method comprising:

transmitting a radio signal from the radar system towards one or more objects;

receiving radio signals reflected from the one or more objects by the radar system, wherein the received radio signals include clutter signals;

forming a set of data periodically from the received signals, wherein the set of data is organized as a two dimensional (2D) array having a plurality of lines of data; and performing a 2D cross point analysis of each set of data to detect the one or more objects, wherein the 2D cross point analysis comprises:

identifying a set of candidate objects by performing an initial one dimensional (1D) analysis on a line of data along a first axis of the set if data to determine a candidate location of each candidate object along the first axis, wherein the set of candidate objects includes false objects; and pruning the set of candidate objects by performing a cross 1D analysis of the data along a second axis of the set of data at a position corresponding to each candidate location along the first axis to select a set of most likely candidate objects from the set of candidate objects.

12. The method of claim 11, wherein a candidate location is selected in the initial 1D analysis for each location along the first axis at which signal strength exceeds a detection threshold value; and further comprising performing a second initial 1D analysis in a neighborhood of each candidate location in which the detection threshold value is reduced by a fixed amount below the signal strength at each candidate location to select additional candidate locations along the first axis.

13. A radar system comprising:

a transmitter operable to provide a radio signal for transmission from the radar system towards one or more objects;

a receiver configured to receive radio signals reflected from the one or more objects by the radar system, wherein the received radio signals include clutter signals; and a signal processing module coupled to the receiver, wherein the signal processing module is configured to perform a signal processing method comprising:

forming a set of data periodically from the received signals, wherein the set of data is organized as a two dimensional (2D) array having a plurality of lines of data;

performing a 2D cross point analysis of each set of data to detect the one or more objects, wherein the 2D cross point analysis comprises:

identifying a set of candidate objects by performing an initial one dimensional (1D) analysis on a line of data along a first axis of the set if data to determine a candidate location of each candidate object along the first axis, wherein the set of candidate objects includes false objects; and pruning the set of candidate objects by performing a cross 1D analysis of the data along a second axis of the set of data at a position corresponding to each candidate location along the first axis to select a set of most likely candidate objects from the set of candidate objects.

14. The radar system of claim 13, wherein a candidate location is selected in the initial 1D analysis for each location along the first axis at which signal strength exceeds a detection threshold value; and further comprising performing a second initial 1D analysis in a neighborhood of each candidate location in which the detection threshold value is reduced by a fixed amount below the signal strength at each candidate location to select additional candidate locations along the first axis.

15. The radar system of claim 13, wherein each set of data corresponds to a frame period that includes multiple chirps of a frequency modulated continuous wave transmitted signal.

16. The radar system of claim 13, wherein each set of data corresponds to a pulse period of a pulsed transmitted signal.

17. The radar system of claim 13, wherein the first axis represents range data and the second axis represents Doppler data.

18. The radar system of claim 13, wherein the first axis represents Doppler data and the second axis represents range data.

19. The radar system of claim 13, wherein the second initial 1D analysis for a candidate location in a line of data is performed before performing a first initial 1D analysis on a next line of data.

20. The radar system of claim 14, wherein the detection threshold for the second initial 1D analysis is reduced by an amount that varies along the first axis.

* * * * *